(12) United States Patent
Harada

(10) Patent No.: US 12,223,828 B2
(45) Date of Patent: Feb. 11, 2025

(54) SYSTEM FOR AND METHOD OF CONTROLLING WATERCRAFT

(71) Applicant: YAMAHA HATSUDOKI KABUSHIKI KAISHA, Iwata (JP)

(72) Inventor: Hidehiko Harada, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 310 days.

(21) Appl. No.: 18/079,032

(22) Filed: Dec. 12, 2022

(65) Prior Publication Data

US 2023/0312071 A1   Oct. 5, 2023

(30) Foreign Application Priority Data

Apr. 1, 2022   (JP) ................ 2022-062135

(51) Int. Cl.
| | |
|---|---|
| *G08C 17/02* | (2006.01) |
| *B63H 20/12* | (2006.01) |
| *H02J 7/00* | (2006.01) |
| *H04L 12/40* | (2006.01) |

(52) U.S. Cl.
CPC ............ *G08C 17/02* (2013.01); *H02J 7/0048* (2020.01); *H02J 7/0063* (2013.01); *H04L 12/40* (2013.01); *B63H 20/12* (2013.01); *H04L 2012/40215* (2013.01); *H04L 2012/40286* (2013.01)

(58) Field of Classification Search
CPC ........ B63H 20/00; B63H 20/12; G08C 17/02; H02J 7/0048; H02J 7/00032; H02J 7/0063; H04L 12/40; H04L 2012/40215; H04L 2012/40286; B63J 2003/002

See application file for complete search history.

(56) References Cited

U.S. PATENT DOCUMENTS

| | | | |
|---|---|---|---|
| 2018/0335825 A1* | 11/2018 | Kim .................. | H04W 52/0235 |
| 2021/0323649 A1 | 10/2021 | Hayashi et al. | |
| 2022/0077692 A1* | 3/2022 | Myers ................. | H01M 10/425 |

FOREIGN PATENT DOCUMENTS

| | | |
|---|---|---|
| JP | 2011-113538 A | 6/2011 |
| JP | 2021-169250 A | 10/2021 |

* cited by examiner

*Primary Examiner* — Aaron L Troost
(74) *Attorney, Agent, or Firm* — Keating & Bennett, LLP

(57) ABSTRACT

A system for controlling a watercraft includes a data communication module, a device system, an electric power supply, and a controller. The data communication module is operable to perform wireless communication with an external computer. The device system includes at least one electric device. The electric power supply provides electric power to the data communication module and the device system. The controller is configured or programmed to switch between a first mode and a second mode. In the first mode, the controller provides electric power to the data communication module by the electric power supply during both activation and deactivation of the device system. In the second mode, the controller provides electric power to the data communication module by the electric power supply during the activation of the device system, but stops providing electric power to the data communication module by the electric power supply during the deactivation of the device system.

18 Claims, 3 Drawing Sheets

SYSTEM FOR AND METHOD OF CONTROLLING WATERCRAFT

CROSS REFERENCE TO RELATED APPLICATIONS

This application claims the benefit of priority to Japanese Patent Application No. 2022-062135 filed on Apr. 1, 2022. The entire contents of this application are hereby incorporated herein by reference.

BACKGROUND OF THE INVENTION

1. Field of the Invention

The present invention relates to a system for and a method of controlling a watercraft.

2. Description of the Related Art

There is a type of watercraft including a data communication module for performing wireless communication with an external computer. For example, Japan Laid-open Patent Application Publication No. 2011-113538 describes a watercraft including a data communication module communicable with a server over the Internet. A controller in the watercraft sends information regarding the watercraft obtained during navigation to the server through the data communication module.

On the other hand, Japan Laid-open Patent Application Publication No. 2021-169250 describes a watercraft equipped with electric devices (e.g., an ECU (Electronic Control Unit), an inverter, etc.) and a battery for electrifying the electric devices. The battery is connected to the electric devices through a BMU (Battery Management Unit). The BMU controls electrifying the electric devices.

The BMU electrifies the electric devices by the battery during activation of a system composed of the electric devices. The BMU stops electrifying the electric devices by the battery during deactivation of the system composed of the electric devices. For example, when the watercraft is stored without being used, the system composed of the electric devices is deactivated, whereby the BMU stops electrifying the electric devices by the battery.

However, when electrifying the data communication module is stopped, communication with the external computer is disabled. Chances are that even during deactivation of the system composed of the electric devices in the watercraft, communication through the data communication module is required for the purpose of, for instance, monitoring the status of the watercraft.

On the other hand, even in such a situation as less frequent use of the watercraft or a long storage term of the watercraft, the battery running out of electricity is a concern when the data communication module is constantly electrified by the battery.

SUMMARY OF THE INVENTION

Preferred embodiments of the present invention enable communication through a data communication module and inhibit a battery from running out of electricity even during deactivation of a system including electric devices on a watercraft.

A system for controlling a watercraft according to a preferred embodiment of the present invention includes a data communication module, a device system, an electric power supply, and a controller. The data communication module is operable to perform wireless communication with an external computer. The device system is connected to the data communication module. The device system includes at least one electric device. The electric power supply includes a battery. The electric power supply provides electric power to the data communication module and the device system. The controller is configured or programmed to control providing electric power to the data communication module and the device system by the electric power supply. The controller is configured or programmed to switch between a first mode and a second mode. In the first mode, the controller is configured or programmed to provide electric power to the data communication module by the electric power supply during both activation and deactivation of the device system. In the second mode, the controller is configured or programmed to provide electric power to the data communication module by the electric power supply during the activation of the device system, but to stop providing electric power to the data communication module by the electric power supply during the deactivation of the device system.

A method according to another preferred embodiment of the present invention relates to a method of controlling a watercraft. The watercraft includes a data communication module, a device system, and an electric power supply. The data communication module is operable to perform wireless communication with an external computer. The device system is connected to the data communication module. The device system includes at least one electric device. The electric power supply includes a battery. The electric power supply provides electric power to the data communication module and the device system. The method includes switching between a first mode and a second mode, providing electric power to the data communication module by the electric power supply in the first mode during both activation and deactivation of the device system, and providing electric power to the data communication module by the electric power supply in the second mode during the activation of the device system and stopping providing electric power to the data communication module by the electric power supply in the second mode during the deactivation of the device system.

According to a preferred embodiment of the present invention, in the first mode, the data communication module is provided with electric power by the battery during both activation and deactivation of the device system. Because of this, communication through the data communication module is enabled even during the deactivation of the system including the at least one electric device. On the other hand, in the second mode, the data communication module is provided with electric power by the battery during the activation of the device system but is stopped from being provided with electric by the battery during the deactivation of the device system. Because of this, during storage of the watercraft, for instance, the battery is inhibited from running out of electricity by selecting the second mode.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
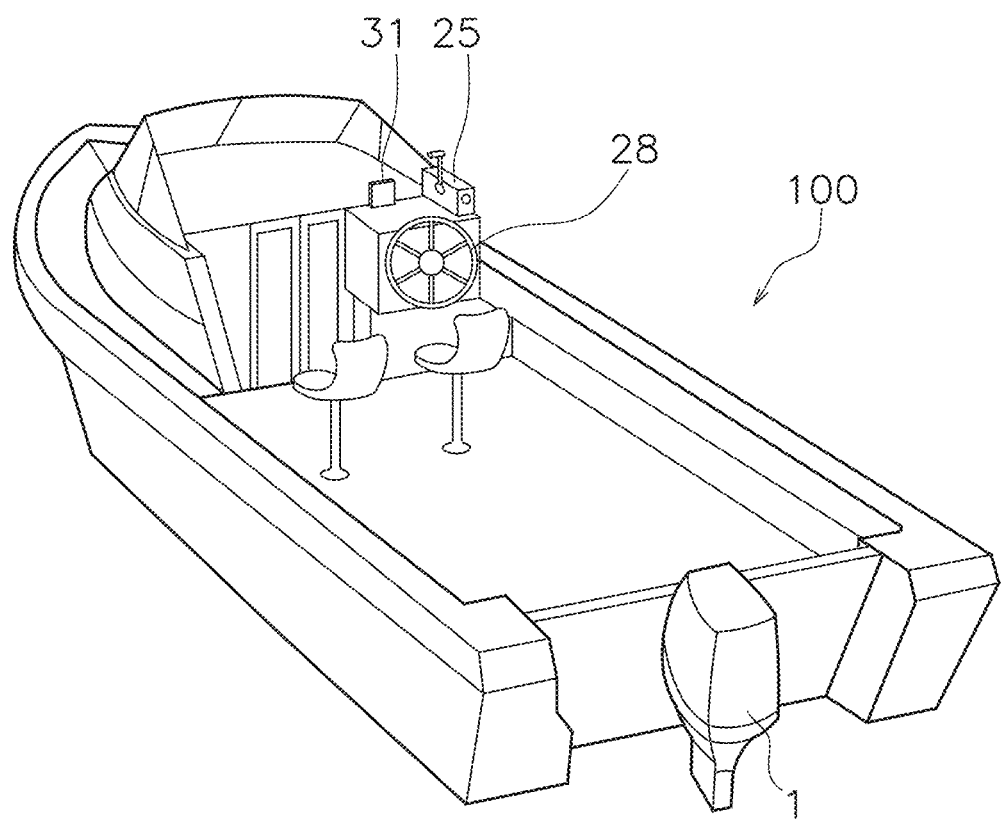
FIG. 1 is a perspective view of a watercraft according to a preferred embodiment of the present invention.

Preferred embodiments of the present invention will be hereinafter explained with reference to the drawings. FIG. 1 is a perspective view of a watercraft 100 according to a preferred embodiment of the present invention. A marine propulsion device 1 is attached to the stern of the watercraft 100. The marine propulsion device 1 generates a thrust to propel the watercraft 100. In the present preferred embodiment, the marine propulsion device 1 is an outboard motor.

Figure 2:
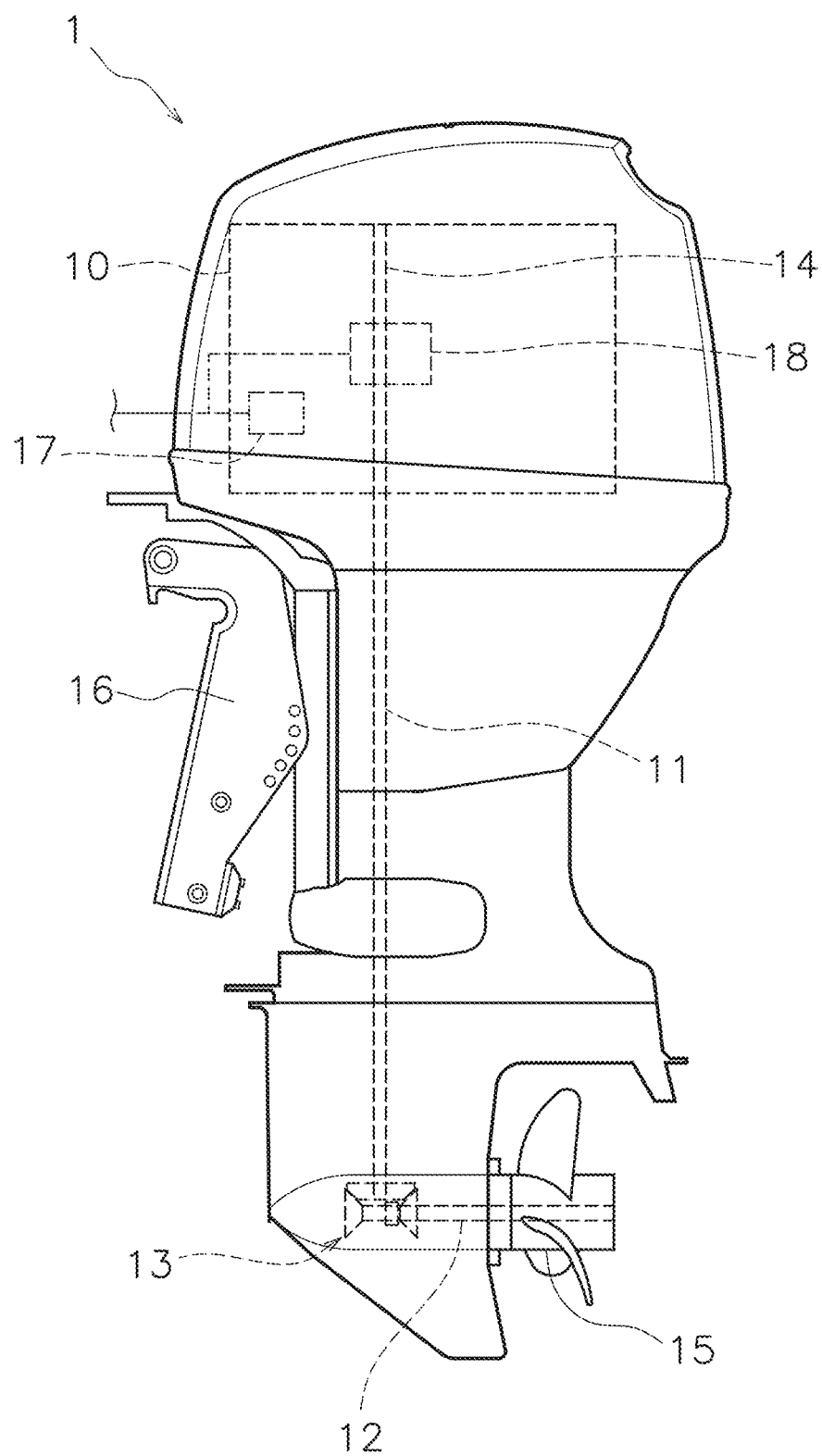
FIG. 2 is a side view of a marine propulsion device.

FIG. 2 is a side view of the marine propulsion device 1. As shown in FIG. 2, the marine propulsion device 1 includes an engine 10, a drive shaft 11, a propeller shaft 12, and a shift mechanism 13. The engine 10 generates the thrust to propel the watercraft 100. The engine 10 includes a crankshaft 14. The crankshaft 14 extends in the vertical direction. The drive shaft 11 is connected to the crankshaft 14. The drive shaft 11 extends in the vertical direction. The drive shaft 11 extends downward from the engine 10.

The propeller shaft 12 extends in the back-and-forth direction of the marine propulsion device 1. The propeller shaft 12 is connected to the drive shaft 11 through the shift mechanism 13. A propeller 15 is connected to the propeller shaft 12. The shift mechanism 13 switches the rotational direction of mechanical power to be transmitted from the drive shaft 11 to the propeller shaft 12. The shift mechanism 13 includes, for instance, a plurality of gears and a clutch that changes meshing of the gears. The marine propulsion device 1 is attached to the watercraft 100 through a bracket 16.

The marine propulsion device 1 includes an ECU (Engine Control Unit) 17. The ECU 17 electrically controls the engine 10. The ECU 17 includes a processor such as a CPU (Central Processing Unit) and memories such as a RAM (Random Access Memory) and a ROM (Read Only Memory). The marine propulsion device 1 includes an electric power generator 18. The electric power generator 18 is connected to the engine 10. The electric power generator 18 generates electricity when driven by the engine 10.

Figure 3:
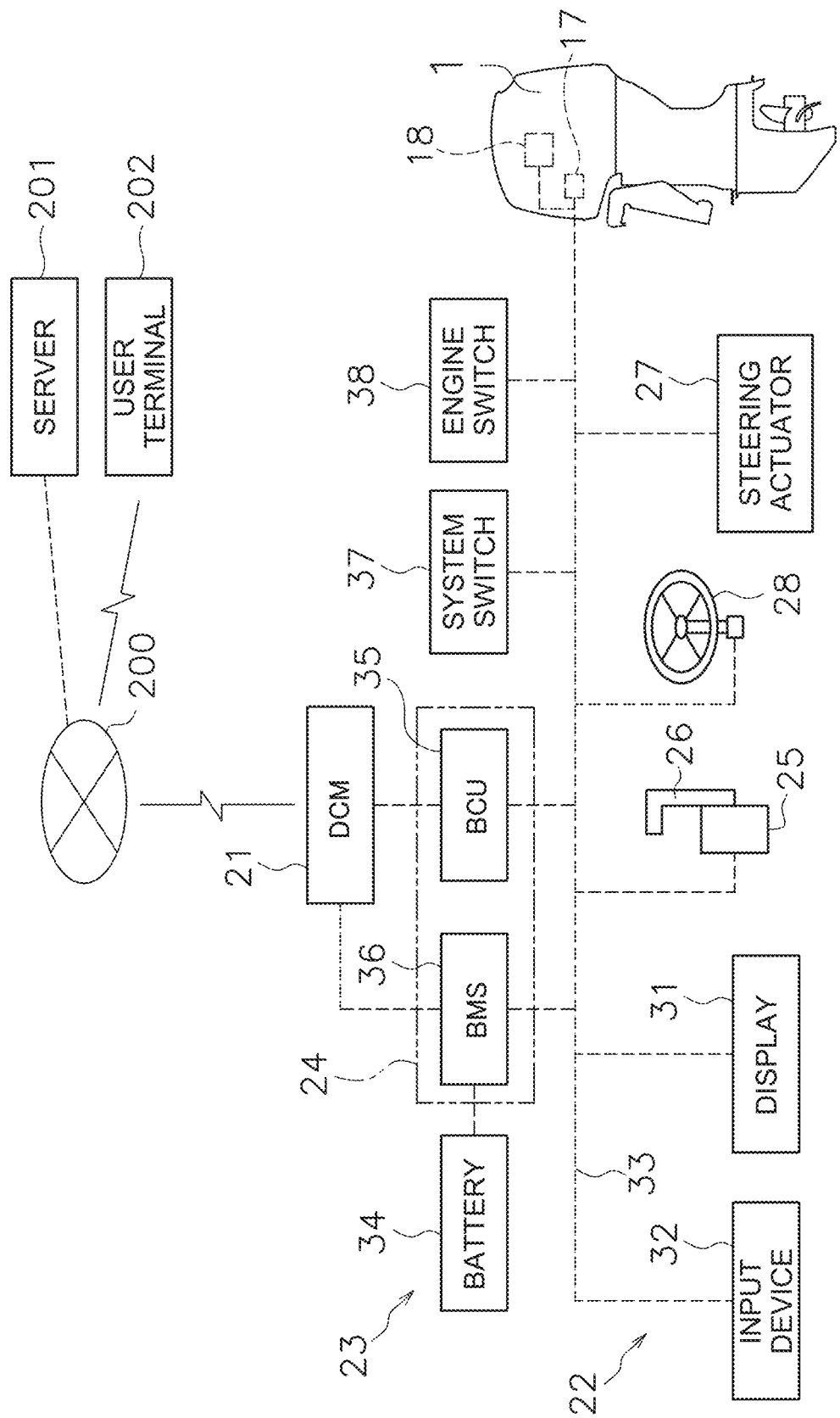
FIG. 3 is a schematic diagram of a system for controlling the watercraft.

FIG. 3 is a schematic diagram showing a configuration of a system for controlling the watercraft 100. As shown in FIG. 3, the control system includes a data communication module (hereinafter referred to as "DCM") 21, a device system 22, an electric power supply 23, and a controller 24.

The DCM 21 performs wireless communication with an external computer. For example, the DCM 21 is able to perform data transmission with the external computer through a mobile communication network 200. The mobile communication network 200 is, for instance, a network of a 3G, 4G, or 5G mobile communication system. The DCM 21 is communicable with a server 201. The DCM 21 is communicable with a user terminal 202. The user terminal 202 may be, for instance, a smartphone, a tablet, or a personal computer. The DCM 21 may be communicable with the user terminal 202 through the server 201.

The device system 22 includes electric devices installed on the watercraft 100. For example, the device system 22 includes the ECU 17 described above. Additionally, the device system 22 includes a throttle-shift operating device 25. The throttle-shift operating device 25 is operable by an operator to regulate the rotational speed of the engine 10 in the marine propulsion device 1. The throttle-shift operating device 25 is also operable by the operator to perform switching between a forward moving action and a rearward moving action by the marine propulsion device 1.

The throttle-shift operating device 25 includes a throttle lever 26. The throttle lever 26 is operable from a neutral position to a forward moving position and a rearward moving position. The throttle-shift operating device 25 outputs a throttle signal indicating the operating position of the throttle lever 26. The ECU 17 receives the throttle signal outputted from the throttle-shift operating device 25. The ECU 17 controls the shift mechanism 13 in accordance with the operating position of the throttle lever 26. Accordingly, the rotation of the propeller shaft 12 is switched between a forward moving direction and a rearward moving direction. The ECU 17 also controls the rotational speed of the engine 10 in accordance with the operating position of the throttle lever 26.

The device system 22 includes a steering actuator 27 and a steering operating device 28. The steering actuator 27 turns the marine propulsion device 1 right and left so as to change the rudder angle of the marine propulsion device 1. The steering actuator 27 includes, for instance, an electric motor. Alternatively, the steering actuator 27 may include an electric pump and a hydraulic cylinder.

The steering operating device 28 is operable by the operator to adjust the rudder angle of the marine propulsion device 1. The steering operating device 28 includes, for instance, a steering wheel. Alternatively, the steering operating device 28 may be another type of operating device such as a joystick. The steering operating device 28 is operable right and left from a neutral position. The steering operating device 28 outputs a steering signal indicating the operating position thereof. The steering actuator 27 is controlled in accordance with the operating position of the steering operating device 28 such that the rudder angle of the marine propulsion device 1 is controlled.

The device system 22 includes a display 31 and an input device 32. The display 31 displays information regarding the marine propulsion device 1. The display 31 displays an image in response to an image signal inputted thereto. The input device 32 receives an operational input from a user. The input device 32 outputs an input signal indicating the operational input by the user. The input device 32 includes, for instance, a touchscreen. It should be noted that the input device 32 may include at least one hardware key.

The device system 22 includes a CAN (Controller Area Network) 33. The electric devices, included in the device system 22, are connected to each other through the CAN 33. The electric power supply 23 provides electric power to both the DCM 21 and the device system 22. The electric power supply 23 includes the electric power generator 18 described above. The electric power supply 23 also includes a battery 34.

The controller 24 controls the electric power provided to the DCM 21 and the device system 22 by the electric power supply 23. The controller 24 includes a boat control unit (hereinafter referred to as "BCU") 35 and a battery management system (hereinafter referred to as "BMS") 36.

The BCU 35 includes a processor such as a CPU and memories such as a RAM and a ROM. The BCU 35 controls the device system 22. For example, the BCU 35 controls the device system 22 in response to the input signal transmitted thereto from the input device 32. The BCU 35 outputs the image signal to the display 31 such that the display 31 is caused to display a desired image. The device system 22 is connected to the DCM 21 through the BCU 35. The BCU 35 controls the electric power provided to the DCM 21 through the CAN 33.

The BMS 36 includes a processor such as a CPU and memories such as a RAM and a ROM. The BMS 36 controls electric power provided to the device system 22 by the battery 34. During driving of the engine 10, the BMS 36 controls charging the battery 34 with the electricity generated by the electric power generator 18. The BMS 36 controls the electric power provided to the DCM 21 by the battery 34.

The control system includes a system switch 37 and an engine switch 38. The system switch 37 is operable by the operator to activate and deactivate the device system 22. The engine switch 38 is operable by the operator to start and stop the engine 10. When the device system 22 is being activated but the engine 10 is being stopped, the device system 22 is provided with electric power by the battery 34. When the device system 22 is being activated and the engine 10 is being started, the device system 22 is provided with electric power by either the battery 34 or the electric power generator 18. It may be determined which of the battery 34 and the electric power generator 18 should be selected as a source of electric power in accordance with the amount of electricity remaining in the battery 34 and the amount of electricity generated by the electric power generator 18.

Next, a control executed by the controller 24 to provide electric power to the DCM 21 will be explained. The controller 24 is switchable between first and second modes to provide electric power to the DCM 21. In the first mode, the controller 24 provides electric power to the DCM 21 by the battery 34 during both activation and deactivation of the device system 22. Therefore, in the first mode, the DCM 21 is constantly communicable with the external computer.

In the second mode, the controller 24 provides electric power to the DCM 21 by the electric power supply 23 during activation of the device system 22 but stops electric power to the DCM 21 by the electric power supply 23 during deactivation of the device system 22. In other words, when the second mode is being selected, the controller 24 provides electric power to the DCM 21 by either the battery 34 or the electric power generator 18 during activation of the device system 22. In this case, the DCM 21 is provided with electric power by the electric power supply 23 through the CAN 33 in the device system 22.

When the second mode is being selected, the controller 24 stops providing electric power to the DCM 21 by the battery 34 during deactivation of the device system 22. During deactivation of the device system 22, the engine 10 is also being stopped. Thus, the electric power generator 18 is also stopped from providing electric power to the DCM 21. Therefore, in the second mode, the DCM 21 is communicable with the external computer during activation of the device system 22 but is not communicable with the external computer during deactivation of the device system 22.

For example, the controller 24 is switched between the first and second modes in response to the operational input into the input device 32. Alternatively, the controller 24 may be switched between the first and second modes in response to a command transmitted thereto from the external computer. The controller 24 may be switched between the first and second modes in response to a command transmitted thereto from the user terminal 202.

The controller 24 may send battery information indicating the amount of electricity remaining in the battery 34 to the user terminal 202. The amount of electricity remaining in the battery 34 is expressed by, for instance, SOCs (States of Charge). The SOCs are associated with charging rates (%) such that a fully charged state is defined as 100%, whereas a fully discharged state is defined as 0%. For example, the controller 24 sends the battery information to the user terminal 202 through the DCM 21 and the server 201. The battery information may be displayed on an application installed in the user terminal 202. The battery information may be displayed on a website accessed by the user terminal 202. The battery information may be sent to the user terminal 202 in the form of an e-mail. The user may send the command to switch between the first and second modes from the user terminal 202 to the DCM 21 in accordance with the amount of electricity remaining in the battery 34.

The controller 24 may be switched between the first and second modes according to a predetermined period of time determined by a timer. For example, the controller 24 may be normally set to the second mode but may be switched to the first mode after a predetermined period of time. Alternatively, the controller 24 may be normally set to the first mode but may be switched to the second mode every predetermined period of time. For example, the controller 24 may be normally set to the second mode but may be switched to the first mode only one day per week. Alternatively, the controller 24 may be normally set to the second mode but may be switched to the first mode for only a predetermined length of time per day.

The controller 24 may set the period of time counted by the timer to switch one of the first and second modes to the other of the first and second modes in response to the operational input into the input device 32. The controller 24 may set the period of time counted by the timer to switch one of the first and second modes to the other of the first and second modes in response to the command transmitted thereto from the user terminal 202.

In the control system according to the present preferred embodiment, in the first mode, the DCM 21 is provided with electric power by the battery 34 during both activation and deactivation of the device system 22. Because of this, communication through the DCM 21 is enabled even during deactivation of the device system 22. By contrast, in the second mode, the DCM 21 is provided with electric power by the battery 34 during activation of the device system 22 but is stopped from being provided with electric power by the battery 34 during deactivation of the device system 22. Because of this, during storage of the watercraft 100, for instance, the battery 34 is inhibited from running out of electricity by selecting the second mode.

Preferred embodiments of the present invention have been explained above. However, the present invention is not limited to the preferred embodiments described above, and a variety of changes can be made without departing from the gist of the present invention.

The marine propulsion device 1 is not limited to the outboard motor, and alternatively, may be another type of propulsion device such as an inboard engine outboard drive or a jet propulsion device. The structure of the marine propulsion device 1 is not limited to that in the preferred embodiments described above and may be changed. For example, the marine propulsion device 1 may include an electric motor instead of the engine 10. The electric devices included in the device system 22 are not limited to those in the preferred embodiments described above. One or more other electric devices may be added to the electric devices. Alternatively, some or all of the electric devices may be replaced by one or more other electric devices. For example, the device system 22 may include one or more other types of electric devices such as a position sensor (e.g., a GNSS (Global Navigation Satellite System) sensor), a compass direction sensor (e.g., a geomagnetic sensor), and/or so forth.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A system for controlling a watercraft, the system comprising:
    a data communication module to perform wireless communication with an external computer;
    a device system connected to the data communication module and including at least one electric device;
    an electric power supply including a battery and operable to provide electric power to the data communication module and the device system; and
    a controller configured or programmed to control providing electric power to the data communication module and the device system by the electric power supply; wherein
    the controller is configured or programmed to switch between a first mode and a second mode;
    the controller is configured or programmed to provide electric power to the data communication module by the electric power supply in the first mode during both activation and deactivation of the device system; and
    the controller is configured or programmed to provide electric power to the data communication module by the electric power supply in the second mode during the activation of the device system, and to stop providing electric power to the data communication module by the electric power supply in the second mode during the deactivation of the device system.

2. The system according to claim 1, wherein the device system includes a CAN (Controller Area Network).

3. The system according to claim 2, wherein the data communication module is provided with electric power by the electric power supply through the CAN.

4. The system according to claim 1, wherein the controller is configured or programmed to switch between the first mode and the second mode in response to a command transmitted thereto from the external computer.

5. The system according to claim 1, wherein the controller is configured or programmed to switch between the first modes and the second mode in response to a command transmitted thereto from a computer of a user.

6. The system according to claim 5, wherein the controller is configured or programmed to send battery information indicating an amount of electricity remaining in the battery to the computer of the user.

7. The system according to claim 1, wherein the controller is configured or programmed to switch from the second mode to the first mode based on a predetermined period of time.

8. The system according to claim 1, wherein the controller is configured or programmed to switch from the first mode to the second mode based on a predetermined period of time.

9. The system according to claim 1, wherein the at least one electric device includes an engine control unitler in a marine propulsion device of the watercraft.

10. A method of controlling a watercraft including a data communication module to perform wireless communication with an external computer, a device system connected to the data communication module and including at least one electric device, and an electric power supply including a battery and operable to provide electric power to the data communication module and the device system, the method comprising:
    switching between a first mode and a second mode;
    providing electric power to the data communication module by the electric power supply in the first mode during both activation and deactivation of the device system; and
    providing electric power to the data communication module by the electric power supply in the second mode during the activation of the device system, and stopping providing electric power to the data communication module by the electric power supply in the second mode during the deactivation of the device system.

11. The method according to claim 10, wherein the device system includes a Controller Area Network.

12. The method according to claim 11, wherein the data communication module is provided with electric power by the electric power supply through the CAN.

13. The method according to claim 10, further comprising:
    switching between the first mode and the second mode in response to a command transmitted from the external computer.

14. The method according to claim 10, further comprising:
    switching between the first mode and the second mode in response to a command transmitted from a computer of a user.

15. The method according to claim 14, further comprising:
    sending battery information indicating an amount of electricity remaining in the battery to the computer of the user.

16. The method according to claim 10, further comprising:
    switching from the second mode to the first mode based on a predetermined period of time.

17. The method according to claim 10, further comprising:
    switching from the first mode to the second mode based on a predetermined period of time.

18. The method according to claim 10, wherein the at least one electric device includes an engine control unit in a marine propulsion device of the watercraft.

* * * * *